Jan. 1, 1952　　　　J. C. HINKLE　　　　2,581,256
BORE GAUGE
Filed Jan. 11, 1946　　　　　　　　　　　2 SHEETS—SHEET 1
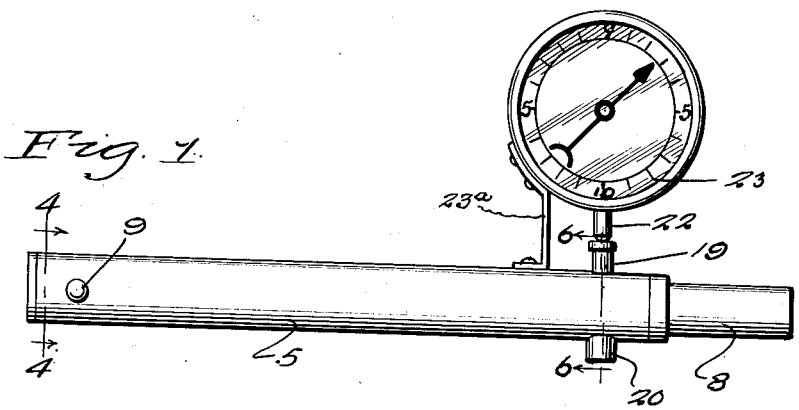
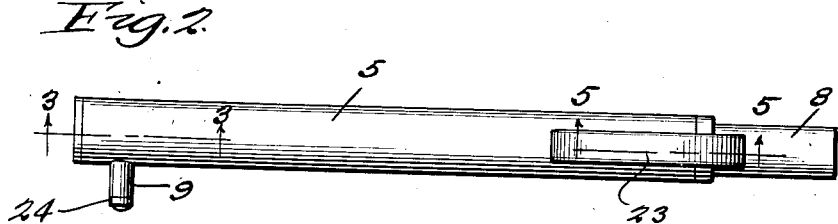
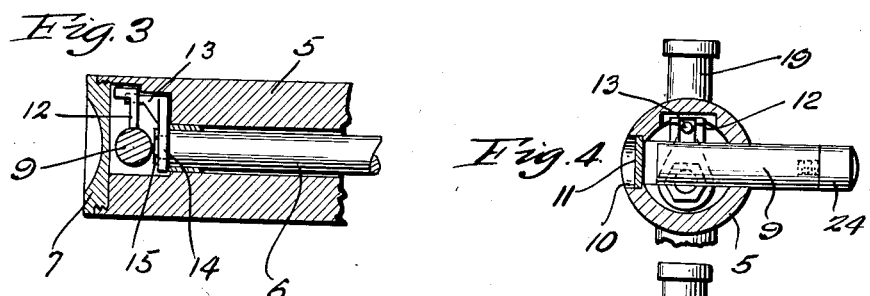
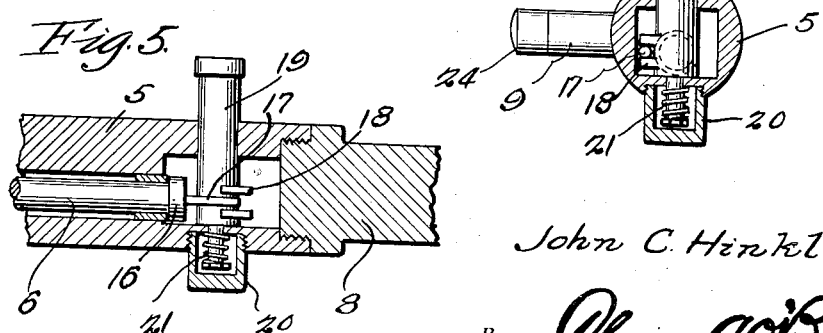
Inventor
John C. Hinkle
By Clarence A. O'Brien
and Harvey B. Jackson
Attorneys Jan. 1, 1952 J. C. HINKLE 2,581,256
BORE GAUGE
Filed Jan. 11, 1946 2 SHEETS—SHEET 2
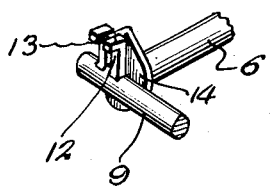
Fig. 7.
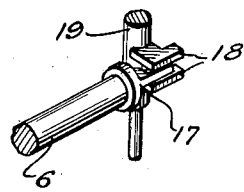
Fig. 8.
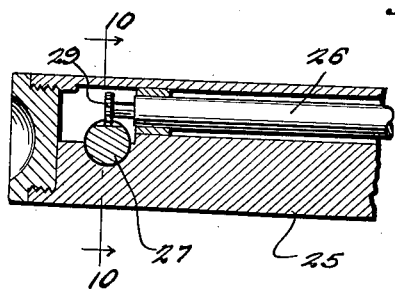
Fig. 9.
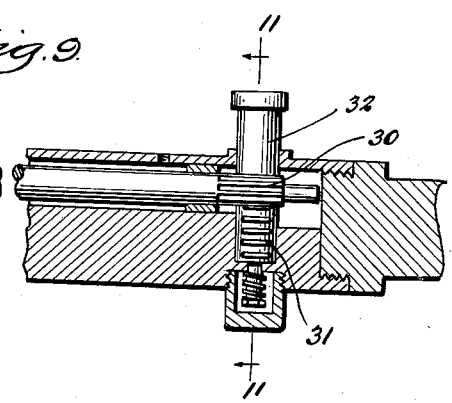
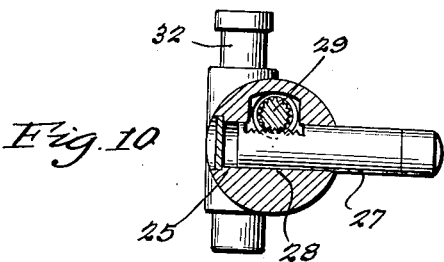
Fig. 10.
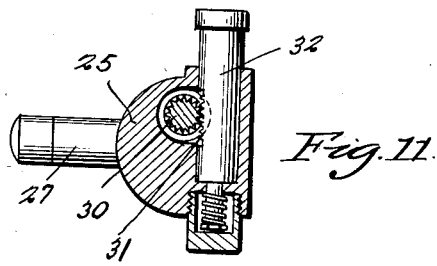
Fig. 11.
Inventor
John C. Hinkle
By Clarence A. O'Brien
and Harvey B. Jacobson
Attorneys Patented Jan. 1, 1952

2,581,256

UNITED STATES PATENT OFFICE 2,581,256

BORE GAUGE

John C. Hinkle, Lincoln, Nebr.

Application January 11, 1946, Serial No. 640,544

2 Claims. (Cl. 33—147)

The present invention relates to new and useful improvements in precision measuring instruments and more particularly to an attachment for use with dial indicators for the purpose of measuring and testing the diameters of cylindrical openings.

An important object of the present invention is to provide a device of this character embodying means for contacting and actuating an ordinary dial indicator and including a contact finger adapted for insertion in the bore of a cylindrical object of comparatively small diameter to determine variations or irregularities therein.

A further object of the invention is to provide a gauge of this character for use with lathes, boring and milling machines for measuring or testing the diameter of bores of the work mounted in the machine.

A still further object of the invention is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a top plan view.

Figure 3 is a fragmentary longitudinal sectional view taken on a line 3—3 of Figure 2.

Figure 4 is a transverse sectional view taken on a line 4—4 of Figure 1.

Figure 5 is a fragmentary longitudinal sectional view of the outer end of the gauge taken on a line 5—5 of Figure 2.

Figure 6 is a transverse sectional view taken on a line 6—6 of Figure 1.

Figure 7 is a fragmentary perspective view of the connection between the shaft and the contact finger.

Figure 8 is a fragmentary perspective view of the connection between the shaft and the transversely moving anvil for contacting the plunger of the indicator.

Figure 9 is a longitudinal sectional view illustrating a modified operating connection between the contact finger and the anvil, and Figures 10 and 11 are transverse sectional views taken respectively on the lines 10—10 and 11—11 of Figure 9.

Referring now to the drawings in detail and first with respect to the form of invention illustrated in Figures 1 to 8 inclusive, the numeral 5 designates a barrel having a shaft 6 rotatably mounted therein. The ends of the barrel are open and threaded in the inner end thereof is a plug 7 while threaded in the outer end of the barrel is an adapter 8 for holding the outer end of the tool with a suitable clamp or chuck.

A contact finger 9 is slidably mounted adjacent one end of the barrel 5 transversely thereof and projects laterally from one side of the barrel, the opening 10 for the finger at the opposite side of the barrel being closed by a plug 11. The finger 9 is provided with a laterally projecting yoke 12 between the legs of which is engaged a crank pin 13 projecting eccentrically from a plate 14 secured to one end of the shaft 6 by a nut or screw 15.

To the other end of the shaft 6 is likewise secured a disc 16 also having a crank pin 17 projecting eccentrically therefrom and engaged between the legs of a yoke 18 projecting laterally from one end of the plunger 19 which is slidably mounted transversely of the barrel 5 adjacent its other end. Said one end of the plunger is enclosed in a cap 20 threaded to the barrel and surrounding said one end of the plunger is a coil spring 21 yieldably urging the other end of the plunger toward a retracted position.

In the operation of the device, as the barrel 5 is moved longitudinally in the bore of the work the contact finger 9 will move along the internal walls of the work and any deviations or irregularities in the bore will result in the finger being moved transversely of the barrel to rotate the shaft 6 and which in turn will project or retract the plunger 19 to actuate the plunger 22 of a conventional form of dial indicator 23 held against the outer end of the plunger 19 by a bracket 23a secured to the barrel 5 as ilustrated in Figure 1 of the drawings, whereby to register such variations or deviations in the bore of the work on the indicator.

The outer end of the contact finger is provided with a detachable head 24 for interchangeably mounting heads of various lengths thereon in accordance with the diameter of the work being tested.

In the form of the invention illustrated in Figures 9 to 11 inclusive, the barrel is designated at 25 having the shaft 26 rotatably mounted therein. The contact finger 27 which projects laterally from the front end of the barrel is formed adjacent its inner end with rack teeth 28 operatively engaging a pinion 29 secured to the front end of the shaft 26.

The rear end of the shaft is likewise provided with a pinion 30 engaging a rack 31 of the plunger 32 which is slidably mounted transversely of the barrel adjacent its rear ends.

Otherwise, the construction is similar to that heretofore explained.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. A bore gauge comprising a barrel adapted for inserting one end in the bore to be tested, a shaft journalled longitudinally in the barrel, a contact finger slidably mounted transversely of the barrel at one end, a plunger slidably mounted transversely of the barrel at the other end, and means operatively connecting the finger and plunger to the shaft for transmitting movement of the finger to the plunger, said plunger being adapted for working engagement with a dial indicator secured to the barrel to register movement of the plunger thereon, said connecting means comprising a longitudinal pin carried eccentrically at each end of the shaft, and yokes extending laterally from the finger and plunger and engaged by the respective pins, said pins having apertured attachment plates, screws inserted through said plates and securing said plates to the ends of said shaft.

2. A bore gauge comprising a barrel adapted for inserting one end in the bore to be tested, a shaft journalled longitudinally in the barrel, a contact finger slidably mounted transversely of the barrel at one end, a plunger slidably mounted transversely of the barrel at the other end, and means operatively connecting the finger and plunger to the shaft for transmitting movement of the finger to the plunger, said plunger being adapted for working engagement with a dial indicator secured to the barrel to register movement of the plunger thereon, said connecting means comprising a longitudinal pin carried eccentrically at each end of the shaft, and yokes extending laterally from the finger and plunger and engaged by the respective pins, said pins having apertured attachment plates, screws inserted through said plates and securing said plates to the ends of said shaft, threaded elements closing the ends of said barrel, the side of said barrel having a threaded bore adjacent the end of said plunger, a screw cap threadedly connected in the last mentioned bore, and a spring within said last mentioned cap and connected with the plunger to urge the same into retracted position.

JOHN C. HINKLE.

REFERENCES CITED

The following references are of record in the file of this patent:

UNITED STATES PATENTS

| Number | Name | Date |
| --- | --- | --- |
| 1,605,923 | Darlington | Nov. 9, 1926 |
| 1,660,986 | Berlowitz | Feb. 28, 1928 |
| 2,100,056 | Klamp et al. | Nov. 23, 1937 |
| 2,192,900 | Eisele | Mar. 12, 1940 |
| 2,229,748 | Lawrence | Jan. 28, 1941 |
| 2,268,579 | Eisele | Jan. 6, 1942 |
| 2,325,996 | Eisele | Aug. 3, 1943 |